Aug. 20, 1968   K. E. BOLEN ET AL   3,397,724
THIN-WALLED CONTAINER AND METHOD OF MAKING THE SAME
Filed June 3, 1966

INVENTOR
K.E. BOLEN
M.E. LARKIN
N.R. WILSON
BY
ATTORNEYS 3,397,724
**THIN-WALLED CONTAINER AND METHOD
OF MAKING THE SAME**
Kenneth E. Bolen, Mark E. Larkin, and Newton R. Wilson, Bartlesville, Okla., assignors to Phillips Petroleum Company, a corporation of Delaware
Filed June 3, 1966, Ser. No. 555,042
10 Claims. (Cl. 150—.5)

ABSTRACT OF THE DISCLOSURE

A thin-walled container made from a yieldable material, for example, of a plastic material, is preformed with walls bulged to a shape such that upon filling the container and allowing it to stand, bulging, which would have occurred had the container been made with planar walls, is substantially reduced or limited. The container is suitable for use to contain milk and is generally of square-type.

---

Figure 2:
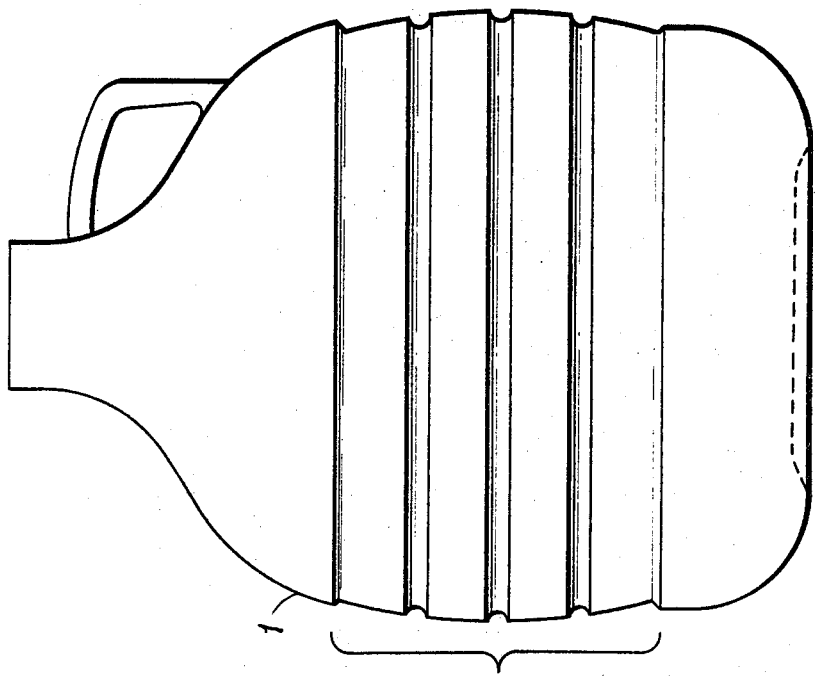

This invention relates to a thin-walled container. In one of its concepts, the invention provides a thin-walled container made, for example, of a plastic material, the walls of which are preformed, bulged to a shape which is substantially that which the container made with vertical walls would adopt upon standing in filled condition. In another of its concepts, the invention relates to a square-type container, for example, made of plastic, the walls of the container being molded or formed bulged approximately to the extent that walls of a similar container, the walls having been formed to be vertical, would bulge when filled and allowed to stand. In a further concept of the invention, it provides a square-type plastic container, for example, a milk container, as now used in dairies, the walls of which are bulged to approximate the bulging which such containers undergo when originally made with vertical walls, filled with, say, milk and allowed to stand. Another concept of the invention is a method of making a thin-walled container prebulged to avoid substantial bulging thereof when filled and allowed to stand by determining the extent of bulging of the usual container and then producing a container the walls of which are prebulged to an extent substantially approximating the extent to which such container otherwise would bulge upon being filled and upon being allowed to stand filled. A still further concept of the invention is to prebulge the bottom of a container as herein described.

There are on the market a large number of containers made of plastic or of other material but possessing thin-wall characteristics. Moreover, many of these containers, for example, milk containers or bottles, especially of the half-gallon and gallon sizes, can be described as square or modified square. Present handling equipment and carrying cases have been and continue to be adapted to the handling of such containers or bottles. When a thin-walled container or bottle, say, made of plastic and having a square or modified square configuration is filled and allowed to stand, the flat sides thereof will bulge to an extent increasing the bottle volume and causing liquid level within the bottle to drop. The bulging in consequent liquid level drop can occur in stages or phases. Initially, a bulging occurs when the bottle is being filled. Then, especially when the bottle is made of plastic there occurs what might be termed a long-term bulging. The long-term bulging occurs slowly as the side wall continues to deflect under long-term load. Obviously, the customer desires to obtain and should obtain full valve. Albeit full value is within the container, viewing the dropped liquid level, the customer is likely to believe that the bottle has been insufficiently filled. The bulging which occurs is not sufficient that the average customer could account for the drop in liquid level by merely considering the precise configuration of the bottle.

We have now conceived that, if the bottle bulging is studied and other bottles are configured to include the bulging which finally occurs, the final volume of a bottle which has been filled and allowed to stand will be substantially the same as the initial volume of the bottle and the liquid level will not materially change after filling. Thus, a square bottle with flat sides was molded of plastic, filled with liquid, and allowed to stand until a final deflected shape was attained. Then, the deflection of the bottle wall was measured. This deflection was then described by a sidewall radius in the plan view of the mold for a bottle according to the invention.

An object of this invention is to provide a thin-walled container. Another object of the invention is to provide a thin walled-container, the walls of which will not bulge when the container is filled and when it is allowed to stand. A further object of the invention is to provide a plastic container, which may be square shaped or modified square shaped, the walls of which will not bulge when the container is filled and/or allowed to stand for a reasonable length of time. It is a further object of the invention still to provide a container which, when filled, will appear at all times to substantially retain the same liquid level therein. A further object still is to provide a method for producing a container which is prebulged so that it will not undergo bulging to any material extent at any of its portions when filled and when allowed to stand filled.

Other concepts and objects of the invention are apparent from a consideration of this description, the drawing and the appended claims.

According to the present invention, there is provided a prebulged container, the sides of which are prebulged to an extent substantially approximating the bulging which would occur when such a container made without prebulging its sides is filled and when it is allowed to stand filled.

Still according to the invention, there is provided a method for producing a thin-walled container with prebulged sides which comprises filling a thin-walled container whose sides are subject to bulging, determining the extent of bulging and then producing an additional container, the sides of which are prebulged to the extent of the determined bulging.

The invention finds particular usefulness in the milk distribution industry. It has been applied successfully to gallon milk bottles of the shape of a modified square. That is to say, these bottles which are made of plastic and when viewed in plan view are generally square in configuration, the corners of the square being somewhat rounded. These bottles or plastic containers have been found to exhibit a degree of bulging of their sides such that the liquid level to which these bottles are originally filled drops. Although there is the same volume of milk in the bottle, it appears that the bottle has not been sufficiently filled when the liquid level has dropped, as discussed herein.

Essentially, the container or bottle can be one which is molded of plastic or other material and, so long as it is subject to bulging when filled and/or when standing filled, it will be so molded or shaped that its sides will be originally bulged, thus avoiding substantial or material bulging when filling and/or when standing filled.

Figure 1:
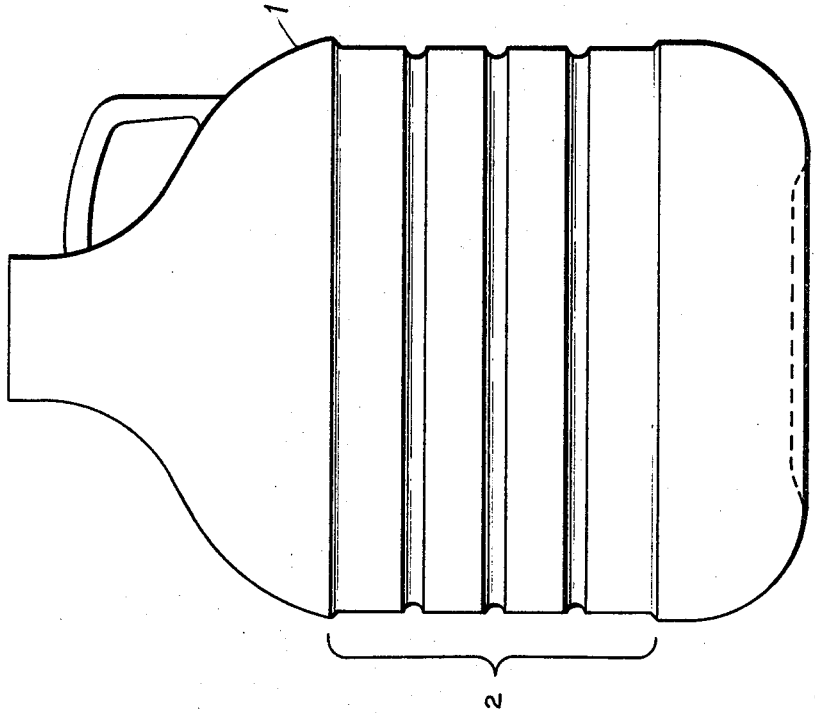

In the drawing, there is shown, in FIGURE 1, a representative milk bottle made of plastic. In FIGURE 2, this bottle is shown molded according to the invention.

Considering FIGURE 1, it will be noted that the side of bottle 1 is substantially vertical over the area of the side generally denoted by 2. Viewing FIGURE 2, it will be noted that the side 2' of the bottle has been bulged and this bulge corresponds to that obtained by filling and allowing the bottle to stand. The plastic of which the bottle is made is not critical. Indeed, the bottle can be made of other materials and, if it bulges, the invention can be applied to making a prebulged bottle of the said material. Other materials which can be used are thin metals, such as aluminum, steel, etc. Other materials suitable for shaping a bottle or container can be used as one skilled in the art in possession of this disclosure having studied the same will select.

Thus, according to the invention, the amount of bulge is anticipated and such a bulge is preformed into the container or bottle so that substantial or material bulging upon filling and upon standing filled of the bottle will not occur.

It will be understood by one skilled in this art having possession of this disclosure that it is not necessary in all cases to completely eliminate bulging. It is within the scope of the invention and, therefore, of the claims to so fill a bottle which is so made that the liquid level will appear to be normal or acceptable when the bottle has been filled and has been allowed to stand. Thus, some extent of bulging after filling and being allowed to stand filled of the bottle is tolerable. Thus, the level to which the bottle is initially filled can be a level which is somewhat above that to which the level will fall when some bulging of the bottle has occurred.

*Example*

In a test with unmodified and modified milk bottles of similar weights and made of plastic, the following results have been obtained.

Each bottle was filled with liquid up to ¼ inch of the top and liquid level drop in the neck of the bottle after 10 minutes observed.

In the unmodified, the drop, over several tests, ran as great as 1½ inches, whereas, with a prebulged bottle, the level dropped only to an extent in the range of ½ to ¾ inch.

The bottles were gallon bottles weighing nominally 90 grams. Such bottles normally vary in weight. Their weight is ordinarily in the range of from about 88 to about 92 grams.

The containers of the invention were fabricated in a commercially available blow molding unit consisting of a combination screw-ram extruder equipped with a 3½ inch screw and a manifold and platen assembly comprising 4 die heads and corresponding molds. The plastic melt is forced by the ram into and through the dies, thereby forming 4 parisons simultaneously. Each parison weighs about 145 grams. The rated output is 334 lbs./hour using Marlex (registered trademark) 6009 MT. This resin is a low odor, linear polyethylene with a nominal density of 0.96 g./cc. and a nominal melt index of 0.9, ASTM D1238–62T, condition E.

Typical extrusion conditions follow:

| | |
|---|---|
| Feed zone temperature, °F. | 311 |
| Transition zone temperature, °F. | 343 |
| Metering 1 temperature, °F. | 340 |
| Metering 2 temperature, °F. | 340 |
| Manifold temperature, °F. | 346 |
| Die head 1 temperature, °F. | 324 |
| Die head 2 temperature, °F. | 326 |
| Die head 3 temperature, °F. | 322 |
| Die head 4 temperature, °F. | 328 |
| Melt temperature, °F. | 360–370 |
| Melt pressure, p.s.i. | 4400 |
| Screw r.p.m. | 75.2 |

Typical molding conditions follow:

| | |
|---|---|
| Mold close time, seconds | 10.8 |
| Blow time, seconds | 9.4 |
| Parison drop time, seconds | 2.1 |
| Total cycle time, seconds | 13.8 |
| Blow pressure, p.s.i. | 80 |
| Mold water temperature, °F. | 42 |

The bulging at maximum diameter of the bottle was 0.16 inch for a bottle having an overall diameter of 5.8 inches. The bottle was 9.5 inches high. The vertical portion of the bottle generally indicated in the drawing at 2 was 3.9 inches high.

The bulging which occurs upon filling the conventional thin-walled container or plastic bottle will occur in spite of the ribs which such bottles have molded into them.

Although some bulging of the top portion and of the bottom portion of the bottle encompassing the essentially vertical sidewall will occur, this bulging is not particularly significant. Nevertheless, in constructing the mold or other shaping device for making a container according to the invention, some bulging at the portion which corresponds to the top and bottom portions of the bottle encompassing the sidewall can be provided.

Clearly, prebulging according to the invention is applicable to the bottom or bottom portions of a container which bulges, as when the container bottom has a raised portion.

Good and now preferred results are obtained with a high density polyolefin such as the Marlex herein described.

Although the invention has been described in connection with essentially planar-walled containers, it is within the scope of the invention to provide prebulged or deformed containers to approximate the ultimate deformed shape taken by filled containers of different shaped wall or walls or bottom when these have been allowed to stand for some time.

Further, the invention can be applied to containers which are ribbed vertically, horizontally or otherwise for stiffening purposes because, even as shown in the drawing, such containers have a tendency to yield to the static head of liquid in them or other forces acting on them.

The following calculations made in connection with plastic bottles, as described, further illustrate the nature of the invention.

$$\text{O.D. bottle neck} = 1.75 \text{ inches}$$
$$\text{area in in.}^2 = \tfrac{1}{4}\pi d^2 = \tfrac{1}{4} \times 3.14 \times (1.75)^2 = 2.4$$
$$\text{O.D. bottle neck} = 1.75 \text{ inches}$$

therefore, 1″ high neck section contains $$2.4 \text{ in.}^2 \times 1'' \times 0.55 \text{ oz./in.}^3 = 1.3 \text{ oz.}$$

or an 0.1″ high neck section contains $$2.4 \text{ in.}^2 \times 0.1'' \times 0.55 \text{ oz./in.}^3 = 0.13 \text{ oz.}$$

Note: Cubic inches to fluid ounces, multiply by 0.55 from Lange's Handbook of Chemistry.

A filled bottle with a 5.75 inches width shows the following.

(a) for a 1″ high section in the center of this bottle $$\text{volume} = 5.75 \text{ in.} \times 5.75 \text{ in.} \times 1 \text{ in.} = 33 \text{ in.}^3$$

or $$33 \text{ in.}^3 \times 0.55 \text{ oz./in.}^3 = 18 \text{ fluid ounces}$$

(b[1]) with a wall bulge averaging 0.1 in. in this section $$\text{volume} = 5.85 \text{ in.} \times 5.85 \text{ in.} \times 1 \text{ in.} = 34.2 \text{ in.}^3$$

or $$34.2 \text{ in.}^3 \times 0.55 \text{ oz./in.}^3 = 18.8 \text{ fluid ounces}$$

Thus, the 1 inch section through the bottle will contain 18 fluid ounces.

---

[1] Equivalent to about a 1.7 percent increase in width.

If the walls gave only 0.1 inch, then the volume would increase about 0.8 ounce. This 0.8 ounce will drop from the neck. Since an 0.1 inch high layer in the neck occupies about 0.13 fluid ounce, then the ratio .13/.1=.8/x=0.6 inch. Thus, an 0.1 inch bulge, as described, will cause an 0.6 inch drop in the neck, under the described circumstances.

The following information is helpful to understand more fully the extent or order of a type of deflection or bulge to which the invention is applicable.

| Sample | 1 | 2 | 3 |
|---|---|---|---|
| Bottle type (one gallon) | Prebulged | Prebulged | Conventional |
| Empty wt., grams | 80.2 | 96.0 | 91.1 |
| Empty width, inches | 5.790 | 5.812 | 5.648 |
| Wall thickness in bottle center, inches | 0.024 | 0.029 | 0.027 |
| Widths of filled bottles, in.: | | | |
| Immediately | 5.875 | 5.882 | 5.748 |
| After ½ hr | 5.890 | 5.904 | 5.794 |
| After 1 hr | 5.907 | 5.911 | 5.799 |
| After 6 hrs | 5.935 | 5.935 | 5.860 |
| After 24 hrs | 5.948 | 5.950 | 5.872 |
| Total deflection, inches | 0.16 | 0.14 | 0.22 |
| Deflection/side | .08 | .07 | 0.11 |
| Side height, inches (dimension 2) | 3⅞ | 3⅞ | 3⅞ |
| Percent deflection, deflection per side×100 side height | 2.1 | 1.8 | 2.8 |

Generally, a prebulged gallon container will exhibit a sidewall deflection of not more than about 2.5 percent and will usually exhibit such a deflection of the order of less than about 2.2 percent.

In a preferred form of the invention, it is applied to produce prebulged bottles or containers of the general size herein discussed which will exhibit not more than about a 2 percent deflection at the midportion of the sidewall after standing filled for 24 hours. In the foregoing data, the one gallon bottle of Sample 1 had an average sidewall deflection of 2.1 percent, that of Sample 2 had a sidewall deflection of 1.8. This is considerable improvement with respect to neck liquid level loss over the conventional or not prebulged bottle of Sample 3 which showed deflection of 2.8 percent, i.e., over 34 percent more than the prebulged bottle of Sample 1. Thus, the deflection observed will be about 25 percent less than without prebulging.

The deflections of the walls are measured or contemplated as being at the midpoint between the top and bottom of the wall surrounding the larger diameter, i.e., the container portion of the bottle not including the neck thereof.

With bottles of certain dimensions, weights and sizes, depending upon the quality of the plastic employed, creep may enter into the ultimate total bulging which has been observed. Without seeking to set forth the exact mechanism of the bottle wall relaxation, it is known that blow molded containers possess built-in stresses. Accordingly, wall thickness, stiffness, yield strength, amount of molded-in stress and density of the liquid contained in the bottle can affect the ultimate deflection. To the extent that these factors and perhaps others including creep of the material enter into the observed bulging, the present invention substantially reduces or eliminates the ultimate observed bulging when the container has been prebulged according to it, as compared with non-prebulged containers. Of course, for a similar material or same material, a thicker wall will deflect less than a thinner wall even as shown in connection with Examples 1 and 2. Accordingly, the values given herein are for purposes of illustrating the invention and not by way of exhibiting a limitation thereof except as there may be limitation respecting the specific example or examples given.

One skilled in the application of considerations such as forces acting within the walls of a container under stress of the contained liquid will recognize that the prebulged container of the invention, because of its shape, will pro tanto tend to distribute the forces acting on it more uniformly within the wall and, therefore, exhibit less creep over extended periods of time when creep otherwise is likely to occur.

Reasonable variation and modification are possible within the scope of the foregoing disclosure, the drawing and the appended claims to the invention the essence of which is that there has been provided a prebulged container which will not materially bulge upon being filled and upon being allowed to stand filled and that a method for determining the extent and character of the "prebulge" of such a container has been set forth, as described.

We claim:

1. A prebulged container having at least three prebulged walls of substantially uniform thickness and made of a yielding material which tends to bulge after the container has been filled, the prebulging of said walls being such that they are shaped originally as made to substantially approximate the bulging which would occur had the container been made with each of its walls substantially planar and unbulged and then filled and allowed to stand filled.

2. A thin-walled plastic, four-walled generally square shaped, liquid container having prebulged sidewalls, the prebulging being according to claim 1.

3. A container according to claim 2 having approximately a one gallon content and exhibiting not more than about 2.5 percent sidewall deflection upon standing filled for 24 hours.

4. A prebulged container according to claim 1 wherein the container is made of polyethylene.

5. A prebulged container according to claim 1 wherein the container is made of a high density polyolefin.

6. A prebulged container according to claim 1 wherein the container is made of a high density polyethylene.

7. A container prebulged according to claim 1 wherein the prebulging is of at least a portion of the bottom wall thereof.

8. A method of determining the prebulge for a prebulged container according to claim 1 which comprises filling an essentially planar-walled container, determining the bulging which has occurred after a period of time when it appears no substantial further bulging will take place and then molding a like container prebulged to approximate the bulging which has occurred.

9. A container according to claim 1 wherein the sidewall deflection occurring is of the order of about not more than 2.2 percent.

10. A container according to claim 1 which, when filled and allowed to stand for an extended period of time, exhibits at least approximately 25 percent less bulging than the same container without prebulging would have exhibited.

References Cited

UNITED STATES PATENTS

| 2,593,408 | 4/1952 | Boardman | 220—18 |
| 2,672,254 | 3/1954 | Boardman | 220—18 X |
| 3,100,576 | 8/1963 | Frank. | |
| 3,152,710 | 10/1964 | Platte. | |
| 3,225,950 | 12/1965 | Josephsen et al. | |

FOREIGN PATENTS

| 1,071,510 | 12/1959 | Germany. |
| 367,104 | 3/1963 | Switzerland. |

DONALD F. NORTON, *Primary Examiner.*